United States Patent
Chen et al.

(10) Patent No.: US 10,242,574 B2
(45) Date of Patent: Mar. 26, 2019

(54) NETWORK COMPUTER SYSTEM TO ADDRESS SERVICE PROVIDERS TO CONTACTS

(71) Applicant: Uber Technologies, Inc., San Francisco, CA (US)

(72) Inventors: Andrew Chen, San Francisco, CA (US); Jeffrey Holden, San Francisco, CA (US); Sonya Ives, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/382,708

(22) Filed: Dec. 18, 2016

(65) Prior Publication Data

US 2017/0272901 A1    Sep. 21, 2017

Related U.S. Application Data

(60) Provisional application No. 62/311,339, filed on Mar. 21, 2016.

(51) Int. Cl.
| | |
|---|---|
| *G08G 1/00* | (2006.01) |
| *G08G 1/14* | (2006.01) |
| *H04W 4/02* | (2018.01) |
| *G08G 1/005* | (2006.01) |
| *H04W 88/02* | (2009.01) |

(52) U.S. Cl.
CPC ............. *G08G 1/142* (2013.01); *G08G 1/005* (2013.01); *G08G 1/143* (2013.01); *G08G 1/146* (2013.01); *G08G 1/147* (2013.01); *G08G 1/148* (2013.01); *G08G 1/202* (2013.01); *H04W 4/02* (2013.01); *H04W 88/02* (2013.01)

(58) Field of Classification Search
CPC ... G07B 13/02; G07B 13/04; G06F 17/30879; G06F 3/0484; H04L 63/102; H04L 67/18; G06K 19/06037; G06Q 50/30; G06Q 30/06; G06Q 30/0641; G06Q 30/0621; G06Q 30/0635; G08G 1/202
See application file for complete search history.

(56) References Cited

U.S. PATENT DOCUMENTS

| | | |
|---|---|---|
| 6,587,782 B1 | 7/2003 | Nocek et al. |
| 7,353,034 B2 | 4/2008 | Haney |

(Continued)

FOREIGN PATENT DOCUMENTS

WO    WO 2011-120161    10/2011

OTHER PUBLICATIONS

International Search Report and Written Opinion in PCT/US2016/037088 dated Aug. 24, 2016.

(Continued)

*Primary Examiner* — Idowu O Osifade
(74) *Attorney, Agent, or Firm* — Mahamedi IP Law LLP

(57) ABSTRACT

According to some examples, a network computer system is provided to perform a first process to authorize a service request using a contact identifier, and to perform a second process to obtain a service parameter for addressing a service provider to a contact. Upon completion of the first process, the network computer system provides a service graphical interface for display on a mobile device of the user. The service graphical interface may display dynamic information that is based on the service parameter.

20 Claims, 7 Drawing Sheets

(56) References Cited

U.S. PATENT DOCUMENTS

| | | |
|---|---|---|
| 7,606,663 B2 | 10/2009 | Neef |
| 7,970,749 B2 | 6/2011 | Uhlir |
| 8,538,956 B1 | 9/2013 | Szabadka |
| 8,630,987 B2 | 1/2014 | Prada Gomez |
| 8,902,260 B2 | 12/2014 | Kuhne |
| 2002/0054082 A1 | 5/2002 | Karpf |
| 2009/0113296 A1 | 4/2009 | Lacy et al. |
| 2009/0156241 A1 | 6/2009 | Staffaroni et al. |
| 2009/0171939 A1 | 7/2009 | Athsani |
| 2009/0222482 A1 | 9/2009 | Klassen |
| 2010/0253542 A1 | 10/2010 | Seder |
| 2011/0052042 A1 | 3/2011 | Ben Tzvi |
| 2011/0081919 A1 | 4/2011 | Das et al. |
| 2012/0041675 A1 | 2/2012 | Juliver |
| 2012/0158445 A1 | 6/2012 | Dufford |
| 2013/0096813 A1 | 4/2013 | Geffner |
| 2013/0132140 A1* | 5/2013 | Amin ............ G06Q 10/02 705/7.13 |
| 2013/0174076 A1 | 7/2013 | Geelen |
| 2013/0196692 A1 | 8/2013 | Huang |
| 2013/0232169 A1 | 9/2013 | Gill et al. |
| 2013/0285855 A1* | 10/2013 | Dupray ............ G01S 19/48 342/451 |
| 2014/0012909 A1 | 1/2014 | Sankar |
| 2014/0067901 A1 | 3/2014 | Shaw |
| 2014/0129951 A1* | 5/2014 | Amin ............ G06Q 50/30 715/738 |
| 2015/0055178 A1 | 2/2015 | Ishibashi |
| 2015/0339928 A1 | 11/2015 | Ramanujam |
| 2016/0019496 A1 | 1/2016 | Gorlin |
| 2016/0301698 A1* | 10/2016 | Katara ............ G07B 13/02 |
| 2016/0370194 A1 | 12/2016 | Colijn |
| 2017/0115125 A1 | 4/2017 | Outwater |
| 2017/0147959 A1 | 5/2017 | Sweeney |
| 2017/0240098 A1 | 8/2017 | Sweeney |
| 2017/0255881 A1 | 9/2017 | Ritch |

OTHER PUBLICATIONS

ISR and Written Opinion in PCT/US2017/023350 dated Jun. 29, 2017.
ISR and Written Opinion in PCT/US2017/023343 dated Jul. 6, 2017.
IPRP in PCT/US2016/037088 dated Dec. 21, 2017.

* cited by examiner

NETWORK COMPUTER SYSTEM TO ADDRESS SERVICE PROVIDERS TO CONTACTS

RELATED APPLICATIONS

This application claims benefit of priority to Provisional U.S. Patent Application No. 62/311,339, filed Mar. 21, 2016; the aforementioned priority application being incorporated by reference in its entirety.

BACKGROUND

For any arbitrary location on the map (e.g., given a latitude and longitude coordinate), a typical reverse geocoding operation returns an address for the location.

DETAILED DESCRIPTION

Figure 1:
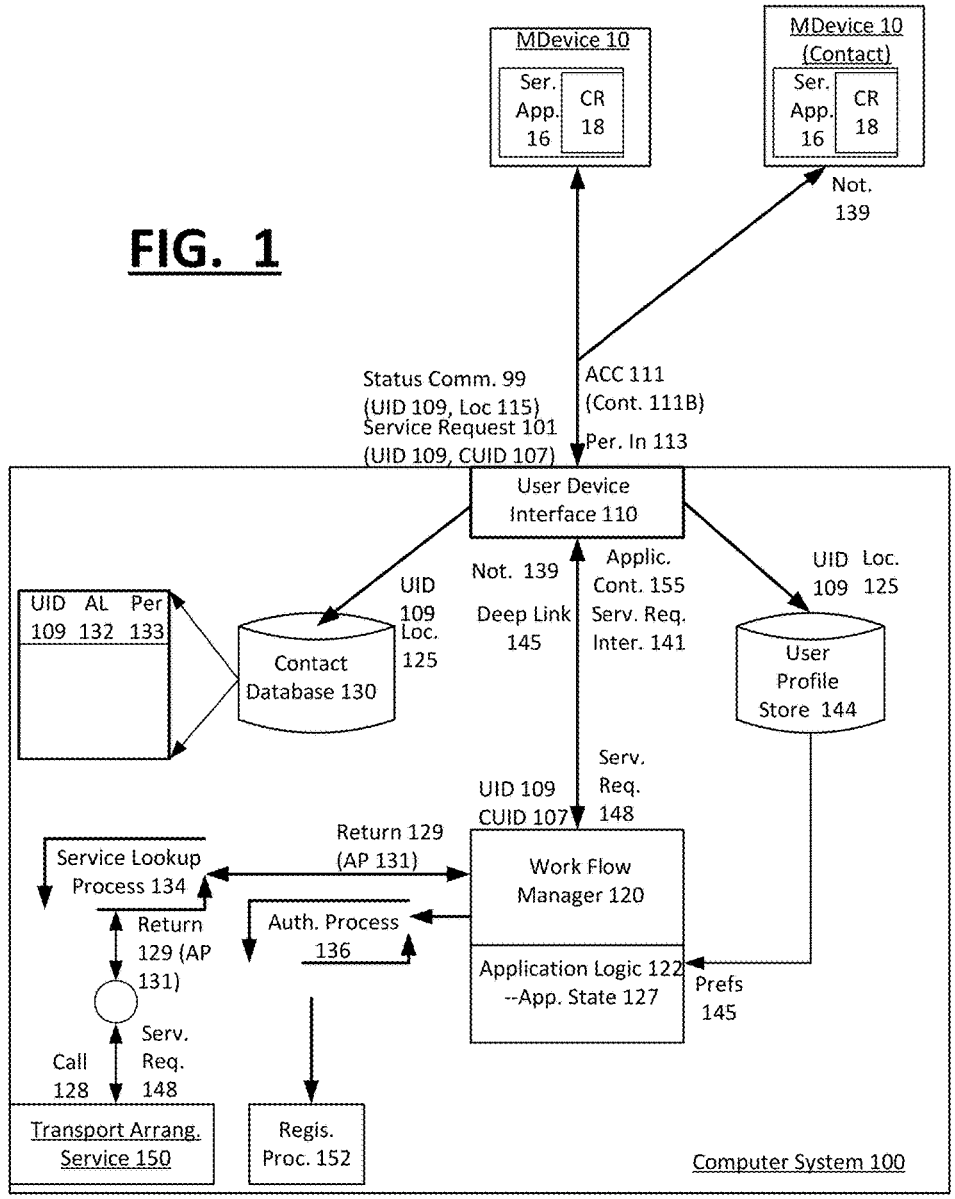
FIG. 1 illustrates an example network computer system for providing location-specific services.

According to some examples, a network computer system is provided to perform each of an authorization process and a service lookup process in connection with addressing a service provider to a current location of a user and/or a contact. The authorization process authorizes a service request using a contact identifier. The service lookup process determines a service parameter for addressing a service provider to a contact. Upon completion of the first process, the network computer system provides a service graphical interface for display on a mobile device of the user. The service graphical interface may display dynamic information that is based on the service parameter.

Among other benefits, examples enable a user to address a service provider to a current location of a contact, without the user having a priori knowledge of the contact's location. Among other technical benefits, examples automate, and thus simplify, the process by which a user can address a service provider to the current location of a contact (e.g., pickup location or drop-off location) by eliminating the need for the user to determine the current location of the contact.

According to some examples, the network computer system automates the determination of a current location in connection with service requests for transport or delivery. The network computer system further automates the determination of current location in a manner that safeguards privacy, while improving efficiency of the distributed computer system as a whole. With improved efficiency, devices that operate as part of the distributed computer system utilize fewer resources and energy, while improving the convenience to the user.

As used herein, a mobile device refers to devices corresponding to desktop computers, cellular devices or smartphones, wearable electronic devices, laptop computers, tablet devices, etc., that can provide network connectivity and processing resources for communicating with the system over one or more networks.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, tablets, laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

An "address," and variants such as "addressing" is intended to mean a description or identifier for determining a location. In the context of a route or navigation, an address can refer to a portion or segment of a route just prior to a transition or completion point.

A "target" refers to an objective for completing a route. According to examples, the target can include a person.

System Description

FIG. 1 illustrates an example network computer system for addressing service providers to contacts. An example computer system 100 of FIG. 1 may be implemented in a variety of computing environments, including as part of a network server provided through one or more servers. In some variations, the computer system 100 can be implemented as part of, or in connection with a transport arrangement service where service providers provide transport between locations. Still further, some examples provide for the computer system 100 to be distributed between a network computer system (e.g., one or more servers) and applications which execute on mobile devices of users.

In an example of FIG. 1, the system 100 includes a user device interface 110, a work flow manager 120 and a contact database 130. In some examples, the system 100 may be distributed to include service applications 16 which execute on the mobile devices 10 of users. The device interface 110 includes or performs processes that run on the network-side of the system 100 to establish communication channels with individual devices of users. For example, the device interface 110 can establish secure sockets with different types of mobile devices, which users of the system 100 can utilize when services are requested.

The work flow manager 120 can implement one or multiple workflows by which the addressing of a service provider to a target can be at least partially automated. The contact database 130 can store one or multiple data structures, or collection of data structures, which list users of a user base for a given type or types of service (e.g., on-demand services, transport services, delivery services, etc.).

In some examples, the user contact database 130 can link or associate each user account with an access list 132 and a set of permission settings 133. Each access list 132 defines a group of contacts whom a user of the linked account can make the subject of a service request. As used herein, a contact can refer to a user that a respective user is connected or linked with (e.g., a colleague, friend, family member, etc.). Each access list 132 may correspond to a sub-group of contacts that a given user can link to his or her account with the system 100. For a given user, an access list 132 may thus include information about contacts who are also users of the system 100. Additionally or alternatively, the access list 132 can include, for a given user, information about contacts who are not users of the system 100. The user may manually, or through execution of the service application 16, identify contacts for use with the system 100 from one or more contact resources 18. By way of example, the contact resources for a given user may be determined from the contact records of a user's phone book (as maintained electronically on a user device, or stored remotely from the user device), and/or as "friends" in a social network account. While each user may be linked to an access list 132 of their contact records, each user may also appear as a contact record for other users of the system 100. The permission settings 133 enable each user to establish rules by which the user can be used as a contact for another user.

In some examples, the respective mobile devices 10 of users may each execute a corresponding service application 16 to exchange different types of communications with the network service. In particular, a user of a mobile device 10 can use the service application 16 to provide different types of input for the system 100. In one implementation, the service application 16 sends and receives status communications 99 with the system 100. Each status communication 99 can identify a user account (or UID) 109 and a current location 115 of the user. The device interface 110 may receive the status communications 99, and update a user profile store 144 and/or the contact database 130 with the information. Still further, while some examples contemplate the mobile devices 10 of the users storing and operating a service application 16, in other examples, for certain users (e.g., users who are not users of the system 100 or do not have an associated account with the system 100), the mobile devices 10 may not yet include the service application 16.

A user may also operate the mobile device 10 to input an access control communication 111. The access control communication 111 may identify contact entries 111B for the user's access list 132. The access control communication 111 can identify the user, as well as contact names or other identifiers of contact records who may also be users of the system 100. The device interface 110 may reference the contact names or other identifiers (e.g., email address, cell phone number) in looking up account identifiers for the contact names. The device interface 110 may then update the access control list 132 of the associated user account in response to receiving the access control communication 111.

The device interface 110 may also receive user input corresponding to permission input 113. The device interface 110 may update the permissions 113 associated with a specified user account of the corresponding communication, to specify, for example, (i) when the user account is made available as a contact record for other associated user accounts (e.g., user can be a contact in evenings and weekdays, but not during workday), (ii) designate different classes of users who may view the particular user as a contact, as well as at what time and/or conditions, and/or (iv) information which may be viewed about the contact to other users, or to other classes of users.

The mobile device 10 may also be used to communicate, via the service application 16, a service request 101. The service requests 101 may specify the user identifier 109 of the requester user, as well as a contact identifier 107 generated from a contact record 103 that is stored on the requester user's mobile device 10. In some examples, the contact record 103 is on the access list 132 of the user. In variations, the contact identifier 107 is determined to not be on the access list 132 associated with the user, in which case the account associated with the contact identifier 107 is added to the user's access list 132. Still further, in other variations, the contact identifier 107.

The work flow manager 120 may include application logic 122, to generate application content 155 which can be communicated to the mobile devices 10 of the individual users. The application logic 122 can maintain or monitor an application state 127 for the service application 16 executing on the device 10 of the user, and the application logic 122 may generate application content 155 to reflect the application state 127. The application state 127 can include, for example, a pre-request state (e.g., set up state), a pending state, a service request state, a service progress state (e.g., en route state where a service provider is progressing to a start location of the service), etc. The application content 155 may also be customized for the user.

The application content 155 in the pre-request state may be communicated to individual applications 16 of the user mobile devices. In the pre-request state, the application content 155 can include user interface features from which the user can view, for example, the contact records of the user's access list 132. In some examples, the application content 155 can access a user profile store 144, to determine a preferred contact 145 of the user. The preferred contact 145 of the user may correspond to, for example, an individual's spouse, a recently used contact (for the system 100 or recently used by the user in making a phone call or sending a message on the user's mobile device 10), or a frequently used contact (for the system 100 or frequently used by the user in making a phone call or sending a message on the user's mobile device 10). In some examples, the user profile store 144 can also identify the favorite location where the user has had service initiated (e.g., pickup for transport) or competed (e.g., drop-off for transport). The determination of frequent or favorite locations (including the location of one or more contacts) may thus be based on, for example, historical information, user information (e.g., name of spouse or friend) and/or designated preferences of the user. Still further, in some examples, the favorite locations of the user can be represented graphically (e.g., as a selectable icon or graphic feature) with the application content 155 of the pre-request state.

According to examples, the service request 101 may specify a person as a target for a service provider. For example, the user can request a service to transport the user to the location of the target (e.g., specified person). In variations, the user can request the service for someone else in which the user, and not the contact, is the target. In either implementation, the system 100 enables the user to specify the transport request without a priori knowledge of the target's current location.

In some examples, the system 100 initiates multiple processes in order to fulfill the service request 101. In an example of FIG. 1, the system 100 implements a service lookup process 134 (or set of processes) to initiate the implementation of a service (e.g., transport service or delivery service) using target locations that coincide to, or are based on, the current locations of the user and the contact identified in the service request 101. The service lookup process 134 obtains service-related information, including information that is dynamic (e.g., time-varying), and information that is specific to location(s). In some variations, the system 100 may also implement an authorization process 136 (or set of processes) to obtain authorization from the person who is identified in the service request 101. The service lookup process 134 and the authorization process 136 may be performed independently and/or asynchronously of one another to fulfill the service request 101. In variations, the service lookup process 134 and the authorization process 136 may be implemented as dependent processes.

In some implementations, the user can specify the target for the service request 101 by specifying an identifier (e.g., last name, moniker, phone number, email address, social network identifier, messenger identifier, etc.) for a person through an interface of the service application 16. In such an implementation, the person identified by the user may not be a user of the system 100 (e.g., the specified user does not have an account), or the user may utilize a resource not local to the application 16, such that the account status of the specified person is not known. The device interface 110 may receive the service request 101 and identify the user account. The work flow manager 120 may make the determination of whether the person identified in the service request 101 is associated with an account or profile of system 100. If the person is not associated with an account, the work flow manager 120 may initiate the authorization process 136 to obtain authorization from a non-account user.

In a case in which the specified person of the service request 101 is not associated with an account, some examples provide that the authorization process 136 initiates an out-of-application invitation (e.g., via a message, such as a short message system (SMS) message or an email message, etc.), using an identifier (e.g., mobile device phone number or email address) of the specified person, as provided by the service request 101. The application content 155 can be communicated to the mobile device 10 of the requesting user to reflect a request pending state. This information may be static or dynamic (e.g., showing status based on response of contact, time of wait, etc.). The authorization process 136 can generate an outgoing message (e.g., SMS message), then monitor a return messaging queue for a reply from the receiving user. The monitoring may be performed for a set duration of time (e.g., 1 hour), before the authorization process 136 terminates, and the work flow manager 120 returns a cancellation for the service request 101. In some variations, the specified person can accept the invitation with a return message. As an alternative or addition, the invitation may provide a link to a registration process 152, by which the person can perform a series of steps (e.g., provide name, number, contact information in fields) to have an account with the system 100. Once the person is associated with the account, the person may be added to the access list 132 of the requesting user.

If the specified person is associated with an account (e.g., maintained in the contact database 140), the work flow manager 120 determines whether the person is a contact of the requesting user. For example, the work flow manager 120 may reference the contact database 140 to determine whether account of the specified person is on the access list 132 of the requesting user. If the specified person of the service request 101 is not a contact of the requesting user, the work flow manager 120 may initiate the authorization process 136 to obtain authorization from a non-account contact. The authorization process may further require the non-account contact to become registered and establish an account via the registration process 152.

If the specified person of the service request 101 is a contact of the requesting user (e.g., the associated account of the specified person is on the access list 132 of the requesting user), the work flow manager 120 may make an additional determination as to whether rules, settings or permission settings 133 associated with the account of the specified person require authorization before the service request 101 is fulfilled. If permission from the contact is required, the work flow manager 120 initiates the authorization process 136 to obtain the permission.

By way of example, the requesting user can operate the mobile device 10 and interact with the service application 16, to scroll through or search for contacts stored on the mobile device 10, or contacts identified from an online account (e.g., social network account). In some examples, a user's action to select a contact also triggers the service request 101 to be communicated to the system 100. In variations, the service request 101 may include an alternative identifier for the contact, such as last name, email, phone number, or other information. The work flow manager 120 may reference the alternative identifier to an account identifier of the contact database 140 to determine the contact record, and then add the contact record to the access list. When no account is identifiable from the identifier provided in the service request 101, the work flow manager 120 may initiate an out-of-application sequence of operations, to obtain the authorization of the specified person and/or to register the person as an account holder. The work flow manager 120 may process the service request 101, and associate the service request 101 with the account identifier 109 of the user. The work flow manager 120 may confirm that the contact record identifier 107 is part of the access list 132 for the user, and that permission settings 133 associated with the user account of the contact record do not preclude implementation of the service request.

In one implementation, the work flow manager 120 determines the current location 125 of the contact specified with the contact record identifier 107 of the service request 101. Depending on implementation, the current location 125 of the contact may be determined before or after authorization is received from the contact. In an implementation, the permission settings 133 that are associated with the contact may require authorization from the contact before the current location is determined. In variations, the current location of the contact may be determined independently or, or before the authorization from the contact is received. For example, the work flow manager 120 may identify the current location of the contact, but based on permission, the work flow manager 120 may not communicate the current location to the 16 of the requesting user until the contact authorization is received.

When authorization is needed from a contact, the work flow manager 120 may transition the service application 16 to the request pending state, where, for example, static or dynamic information is provided as part of the application content 155 that is communicated to the mobile device 10 of the requesting user to reflect the request pending state. With initiation of the request pending state, the work flow manager 120 may also initiate the authorization process 136 to obtain approval of the contact of the request. The authorization process 136 can generate a notification 139 to the contact through the device interface 110, using for example, a contact identifier 107 which may be associated with the contact in the contact database 140. Alternatively, the notification may be communicated through a messaging (e.g., Short Message Service) medium.

The authorization process 136 can then monitor for the approval from the contact. For example, the contact may message acceptance via the service application 16 or through the alternative messaging medium. The reply message may reference an identifier of the original notification. The device interface 110 may receive the reply message, and reference the identifier to an instance of the authorization process 136. The device interface 110 may forward the reply to the authorization process 136, and the authorization process 136 may return to the work flow manager 120 a communication that indicates the approval (or disapproval) of the contact. In some examples, the authorization process 136 can monitor for the authorization or reply of the contact for a maximum threshold of time. If the communication is not received, the authorization process 136 is terminated, and the work flow manager 120 responds to the service request 101 with a cancellation.

According to some examples, the work flow manager 120 determines the current location of the contact without further input from the requesting user. In one implementation, the contact's current location 125 may be determined from the user contact database 140. In a variation, the contact's current location 125 may be determined from triggering a data exchange with the mobile device 10A of the contact. The current location of each of the current user or contact may be implemented as either static or dynamic information. When static, the contact's current location 125 does not change, after it has been determined. When dynamic, the contact's current location 125 can be variable, even after when the service request 101 is received and implemented. For example, the contact can walk or otherwise be in motion when a service provider is being selected, or when the other user is traveling to meet the contact. Alternatively, the contact may be receiving their own transport when the service request 101 is made or performed, such that the transport of the user may follow or meet the transport of the contact. Similarly, in examples in which the current location of the requesting user is dynamic, the requesting user can walk or do other activity when, for example, the service provider is being selected, or when the service provider is traveling to meet the user. In such examples, the current location of the requesting user and/or contact may be tracked based on, for example, the status communications communicated from the mobile device of the contact.

The work flow manager 120 may initiate the service lookup process 134 to obtain service information for the requesting user, based on the current locations of the requesting user and the specified contact. The service lookup process 134 may generate, for example, one or more service calls 128 for a service arrangement service 150 (e.g., a transport or delivery arrangement service). In some examples, the system 100 is an integrated aspect of the service arrangement service 150. In variations, the service arrangement service 150 may be implemented as a separate or independent service from the system 100. The service call 128 may specify the current locations and account identifiers for the contact and the requesting user. The work flow manager 120 implements, without further input from the requesting user, operations to use the response 129 of the service arrangement service 150 to at least initiate an arrangement for a service provider to complete a service, given the current locations of the requesting user and/or the contact.

In some examples, the system 100 may receive the response 129 from the service call 128, identifying service parameters 131 that are specific to the current locations of the requesting user and the contact. As an addition or alternative, one or more of the service parameters 131 can be dynamic, in that the service parameter may reflect a time-varying value.

In some examples, the service lookup process 134 and the authorization process 136 may be initiated concurrently, with the outcome (e.g., whether the contact will authorize) and its timing being unknown (e.g., when will contact authorize). In such cases, the service arrangement service 150 may operate to maintain the value of the service parameters 131 artificially static for a set period of time. Alternatively, the work flow manager 120 may place repeated service calls 128 to the service arrangement service 150 to receive the updated service parameters 131. In some examples, the service being provided includes transport, and the service parameters 131 provided with the return 129 includes any one or more of (i) estimated trip time, given current locations of the requesting user; (ii) estimated time to pickup of requesting user, given current location of requesting user, (iii) estimated cost for service, and/or (iv) types of vehicles which are available. In some variations, transport-specific service parameters can be dynamic when, for example, (i) either of the current locations are dynamic, (ii) traffic conditions vary the estimated time of arrival or pickup, (ii) supply or demand for service change, and/or (iv) availability of specific types of vehicles change.

In some examples, the work flow manager 120 may complete the service lookup process 134 and the authorization process 136, then transitions the application state 127 to a service request state using the service parameters 131 provided in the response 129. The work flow manager 120 may structure the application content 155 to include service graphical interface 141 for the service application 16 of the requesting user. The service graphical interface 141 may include information determined from the service parameters 131, including dynamic information, as well as information that is location-specific and/or user-specifics. The requesting user may further interact with the service graphical interface 141 in order to generate a service request 148 for the service arrangement service 150. In variations, the work flow manager 120 completes the service lookup process 134 and the authorization process 136, then automatically initiates a service request 148 with the service arrangement service 150.

According to some examples, the service graphical interface 141 corresponds to an order interface, which may display, for example, a prospective route for the user or contact that receives the service to the target. The dynamic information provided by the service parameters 131 as part of the order panel may include the estimated travel time for a service provider to arrive at one or both of the current locations. As an addition or alternative, the dynamic information provided by service parameters 131 may include information that is based on, for example, a number of service providers who are in a vicinity of the user.

In response to receiving the service request, some examples provide that the service arrangement service 150 may generate and return an application link 145 (e.g., deep link), which the work flow manager 120 can send to the 16 of the user's mobile device 10. In variations, the service arrangement service 150 may generate service status information that is communicated to the mobile device 10 of the user through the system 100, or through an alternative communication medium (e.g., via SMS messaging).

In variations in which an application link 145 is generated, the application link 145 can be activate on the mobile device 10 of the user, either automatically or through user selection, to continuously display content generated by the service arrangement service 150. For example, the service arrangement service 150 may feed service status for the requesting user via the link 145. In the case where service request 101 is to transport the requesting user to the current location of the contact, the content provided to the mobile device 10 can include (i) position of the selected vehicle en route or traveling to the current location (or pickup location, if different) of the requesting user, and (ii) trip information (e.g., estimated time to arrival) once the requesting user enters the vehicle of the service provider. In the case where the service request is to transport the contact from the contact's current location to the requesting user, the content provided to the mobile device 10 can include (i) position of the selected vehicle en route to the current location of the contact, and (ii) trip information (e.g., estimated to arrival) once the contact enters the vehicle.

In some examples, a customer may request a delivery service (e.g., package delivery, service process) in which a package is delivered to a specific person, and the target addressing system 100 addresses a provider (e.g., package deliverer) to arrive at the location of the target person, with the provided address being sufficient to instruct the provider to locate the target without need of assistance or return communication from the target. Accordingly, examples provide for the target addressing system 100 to address the transit request to a current location of a target even while the location of the target is in flux.

Methodology

Figure 2A:
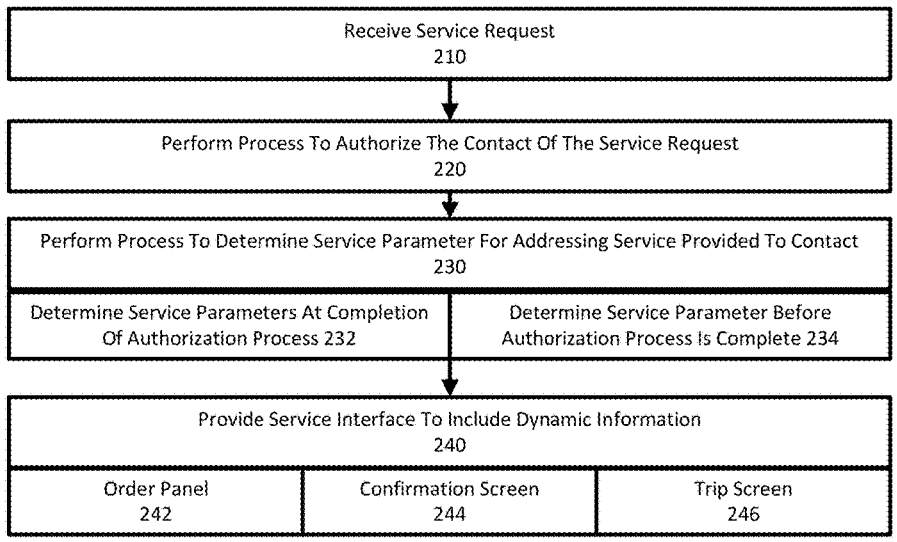
FIG. 2A illustrates an example method for addressing a service provider to a target of a service request.
Figure 2B:
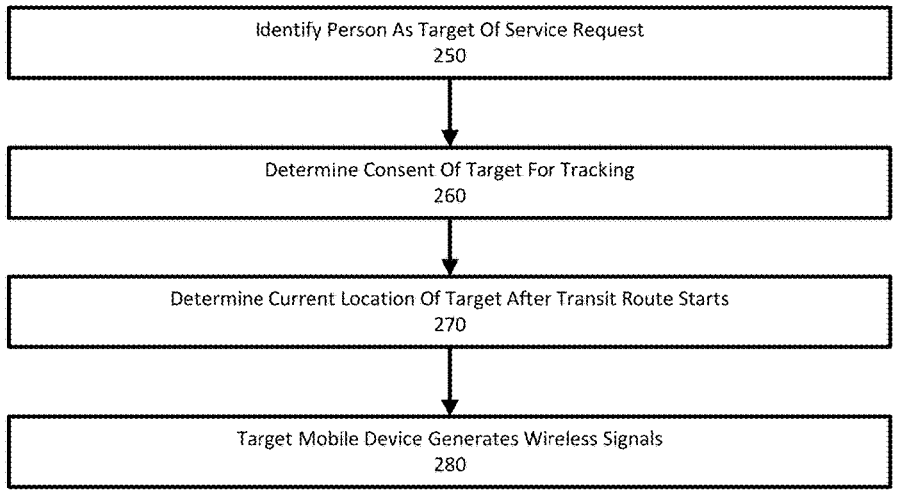
FIG. 2B illustrates a method for addressing a vehicle to a target that is a person.

FIG. 2A illustrates an example method for addressing a service provider to a target of a service request. FIG. 2B illustrates a method for addressing a vehicle to a target that is a person. In describing examples of FIG. 2A and FIG. 2B, reference may be made to elements of FIG. 1 for purpose of illustrating suitable components for performing a step or sub-step being described.

With reference to an example of FIG. 2A, the network computer system 100 receives a service request from a user associated with an account (210). The service request 101 may specify the requesting user as the target for addressing the service provider. In variations, the service request 101 may include a set of data that identifies, or correlates to a contact or other person as the target for addressing the service provider. In some examples, the service request is for transport to a target. Depending on implementation, the target may coincide with the current location of the contact whom the user is to transport to. In variations, the target may coincide with the current location of the requester, whom the contact is transporting to.

The network computer system may perform a first process to authorize the service request (e.g., authorization process 136) using an identifier of the contact (220). For example, the user can transmit a service request 101 that identifies contact by account identifier, cell phone, email address or last name. The network computer system 100 may initiate a communication to the contact using one of multiple available processes.

The network computer system may perform a second process to determine a service parameter 131 for addressing a service provider to a contact (230). The service parameter 131 may be variable over a duration in which the first process is performed. By way of example, the computer system 100 may operate to maintain the authorization process open for one hour, during which the value of the service parameter 131 may fluctuate. In one example, the service parameter 131 may correspond to a duration of time that the service provider is expected to need in order to complete the service ("completion time"). The completion time may vary based on when the service parameter 131 is determined. For example, in the context of transport, the completion time may correspond to a trip time for service provider to provide transport between the current locations of the requesting user and the contact. In this context, the trip time may vary based on factors such as presence of traffic on roadways.

In other examples, the service parameter 131 includes a cost for the service provider to provide the service (e.g., trip fare), which may be dependent on a number of service providers which are available when the service is actually initiated. The number of service providers that are near, for example, the requesting user may fluctuate over an hour. As a result, the cost (e.g., fare) for the user in receiving the requested service may also fluctuate.

In some examples, the service parameter may be determined at the completion of the authorization process 136 (232). In variations, the service parameter is determined before the authorization process is complete (234). For example, one of the service parameters may be estimated shortly after the service request 101 is received, when the authorization process is initiated, but not completed.

According to some examples, the computer system 100 generates a service graphical interface that can be displayed on a mobile device of the user upon completion of the authorization process 136. The service graphical interface may include dynamic information that is based on the service parameter (240). In one implementation, the service graphical interface is an order panel, which the user can select to order to request service from a service provider (242). For example, in the context of transport services, the order panel may display dynamic information that is based on service parameters such as, (i) time for service provider to pick-up contact or user, (ii) trip time between the determined locations of the user and contact, and/or (iii) amount for the service. From the order panel, the user may order the service. In variations, the service graphical interface may include a confirmation screen (244), confirming the order of the user, and/or a trip screen (246), showing the trip in progress.

With reference to an example of FIG. 2B, the computer system 100 identifies a person as a target of a service request 101 (250). The system 100 can, for example, perform a look-up of the identifier provided for the target as part of the service request, in order to determine a device identifier for the person. For example, the service request 101 may specify a contact person by name, and the device interface 110 or other logic of system 100 may identify the phone number, or service application identifier for the person.

The computer system 100 may determine that the service requester is authorized to specify the target as a contact for whom a service provider can be addressed (260). The authorization for using the target as a contact may take alternative forms, depending on the implementation. For example, the particular person specified as the target in the service request 101 may be associated with an account that has provided authorization to be identified on the access list 132 of the requesting user. As an addition or alternative, the target can be associated with an account that includes permission settings 133 which permit the user to target the contact for purpose of addressing a transport service. For example, the person who is the contact (or target) may have provided permission settings 133 that permit the computer system 100 to (i) track his or her current location, (ii) determine his or her location when the service request is received, and/or (iii) communicate the current location to the requesting user. In some examples, the permission settings 133 can be determined from an account of the contact, signaling the contact's consent to (i) be tracked by the computer system 100, in order to authorize a service request to address a service provider to the current location of the contact; and/or (ii) have their current location made available to the requesting user for purpose of addressing a service provider to the current location of the contact. According to some examples, the computer system 100 may send a request to the contact to obtain the contact's consent or authorization. With consent or authorization, the mobile device 10 of the contact may also be tracked, such that that the current location of the contact is dynamic.

According to some examples, once the addressing is initiated (e.g., dispatch service provider on transit route), the computer system 100 may make one or more requests from the contact's mobile device 10 for information that identifies a current location of the contact (270). Thus, for example, the current location of the contact can be dynamic. Additionally, the current location of the contact may be verified. In an implementation in which the requester is transported to the current location of the contact, the service provided in response to the service request may be completed at the current location of the contact. In an implementation in which the contact is transported to the current location of the requester, the service provided in response to the service request is completed at the current location of the contact.

In some examples in which the requester is transported to the contact, the requested service may terminate at a location that is near the current location of the contact. For example, the contact may be walking about in a mall. Likewise, in variations in which the contact is transported to the requester, the requested service may also terminate at a location that is near the current location of the requester. In such examples, the computing system 100 may cause the mobile device of the target (whether the target is the user or the contact) to generate communications or wireless signals which are detectable to the transported party (280). For example, if the target is located in a crowded area (e.g., restaurant), the mobile device 10 of the target may be signaled to emit an audible or display a light.

Examples

Figure 3A:
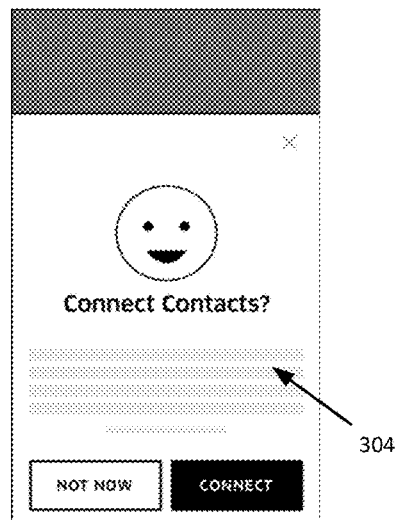
FIG. 3A through FIG. 3J illustrate various application interfaces of a service application executing on a mobile device of a user, according to various examples.

FIG. 3A through FIG. 3J illustrate various application interfaces of a service application executing on a mobile device of a user, according to various examples. In FIG. 3A, the service application 16 is shown in a set up state. In the set up state, the service application 16 may execute to render a contact interface 304. The contact interface 304 enables the service application 16 to access a contact resource that corresponds to a local contact data store, maintained as part of a contact application or operating system of the mobile device 10.

Figure 3B:
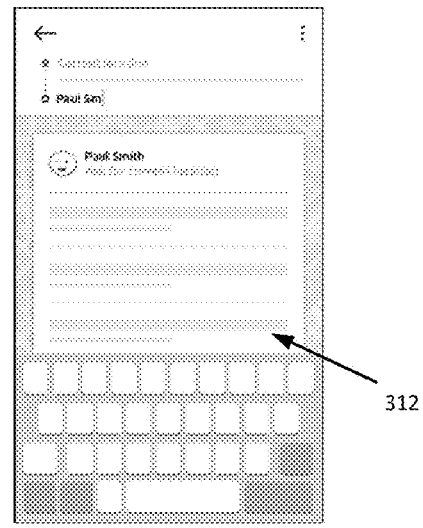

In FIG. 3B, the service application 16 is shown in a pre-request state, in which the service application provides a lookup interface 312 to enable the user to specify a contact for a service request. The user can perform a local search for a contact record (e.g., "Paul Smith") corresponding to an individual who has an account with the computer system 100. Alternatively, the local search can identify individuals who do not have an account with the computer system 100. The user can specify the service request using a contact name, as locally stored, and the network computer system 100 may operate to determine, for example, the user identifier 109 for the contact name.

Figure 3C:
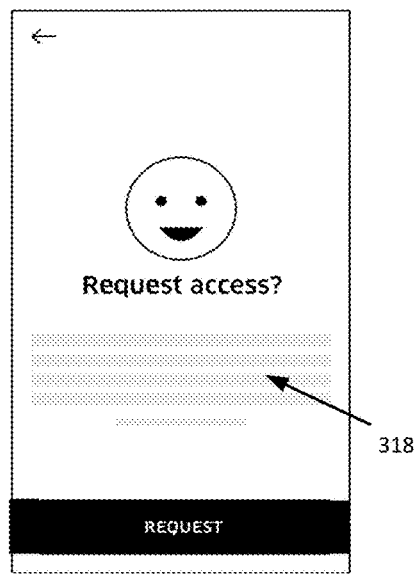

In FIG. 3C, the service application 16 provides a confirmation panel 318 for a service request when in the pre-request state. The confirmation panel 318 confirms that a person of a local contact record is to be specified in a service request.

Figure 3D:
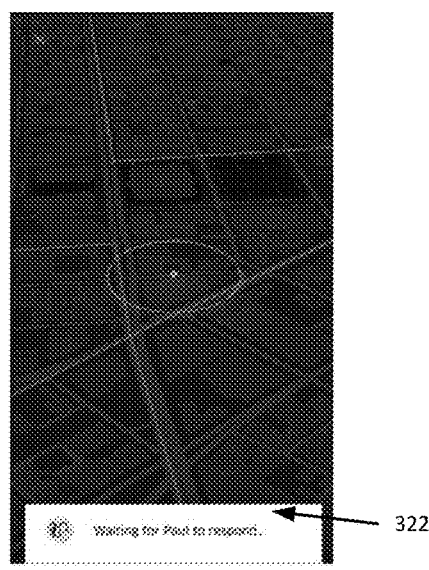

In FIG. 3D, the service application 16 is transitioned into a pending state. In the pending state, the application 16 displays a pending interface 322 on the mobile device 10 of the user. Concurrently, the computer system 100 may initiate the authorization process 136. On the backend, the authorization process sends a notification from the network computer system to the mobile device of the contact, to request access to the contact's location. After sending the notification, the authorization process 136 waits for the contact to reply to the service request notification.

Figure 3E:
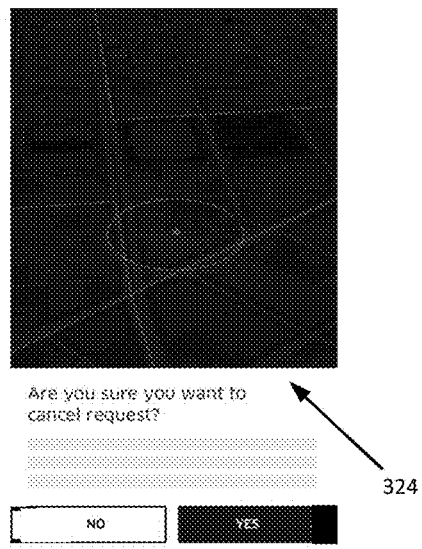
Figure 3F:
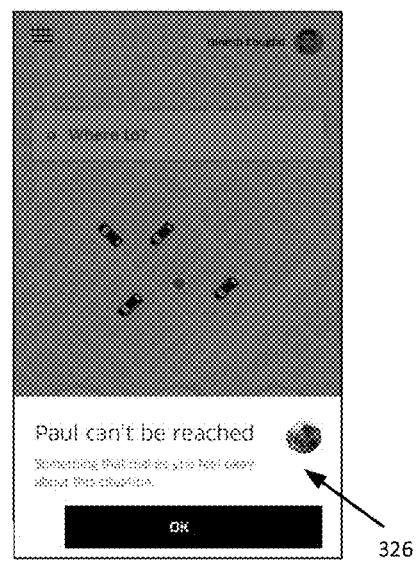
Figure 3G:
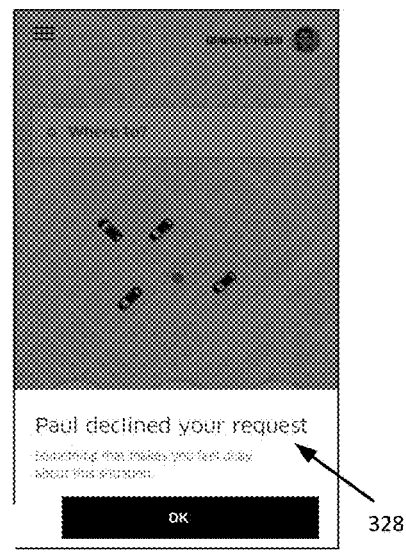

FIG. 3E through FIG. 3G illustrate alternative outcomes for the authorization process 136, each of which terminate the pending state of the service application. In FIG. 3E, a cancellation interface 324 is shown when the service application is in the pending state. Using the cancellation interface 324, the user may cancel his service request.

In FIG. 3F, a timeout interface 326 is shown, when the authorization process 136 times out on determining authorization due to passage of time. For example, the authorization process 136 may timeout one hour after sending the authorization notification to the contact of the service request.

In FIG. 3G, a declination interface 328 is shown, when the authorization process 136 receives input from the contact, denying authorization to have the contact's location determined or communicated for the service request of the user.

Figure 3H:
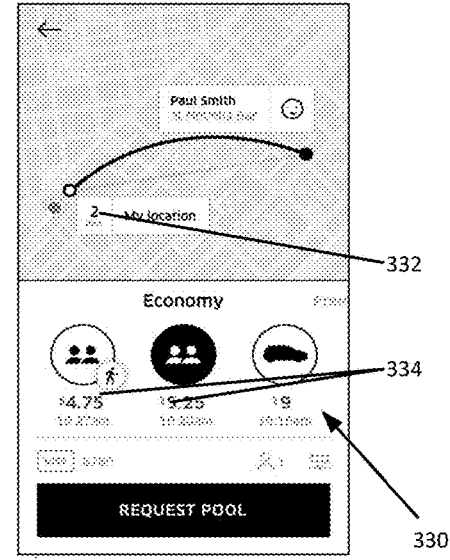

In FIG. 3H, the service application is shown in a service request state. In the service request state, an order panel 330 is displayed with dynamic information that is based on service parameters 131. The dynamic information provided with the order panel 330 may include the estimated trip time 332 or time of arrival of contact to target location. Such timing information vary over a relatively short duration of time (e.g., over 15 minutes, over 1 hour) based on factors such as traffic conditions and availability of service providers. Likewise, pricing or fare information 334 may vary based at least in part on an availability of service providers. In some examples, the order panel 330 may provide alternative sets of information, based on a class level of service providers.

In some examples, the current location of the contact may be displayed with the order panel 330 that is displayed on the mobile device of the requesting user. In variations, the current location of the contact may be undisclosed on the order panel, while information such as trip time or estimated time of arrival are shown.

Figure 3I:
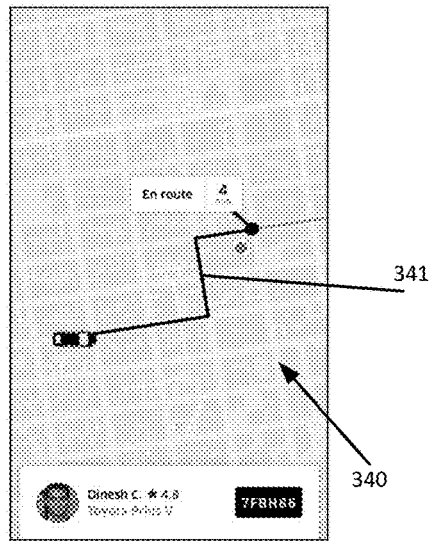

In FIG. 3I, the service application 16 is shown in a service in progress state. An en route interface 340 displays map content, with a prospective route 341 that a service provider is taking to transport the user to the contact (as the target).

Figure 3J:
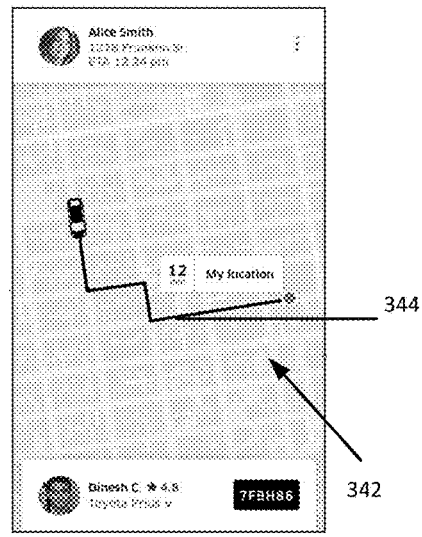

FIG. 3J illustrates a variation in which the user is the target for the service provider when the application 16 is in the service in progress state. In one implementation, an alternative en route interface 342 displays a prospective route 344 of a service provider transporting the contact to the user as the target.

Figure 4A:
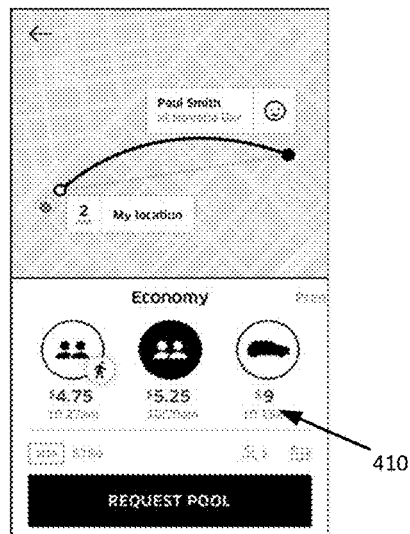
FIG. 4A and FIG. 4B illustrate application interfaces of a service application executing on a mobile device of a contact, according to various examples.
Figure 4B:
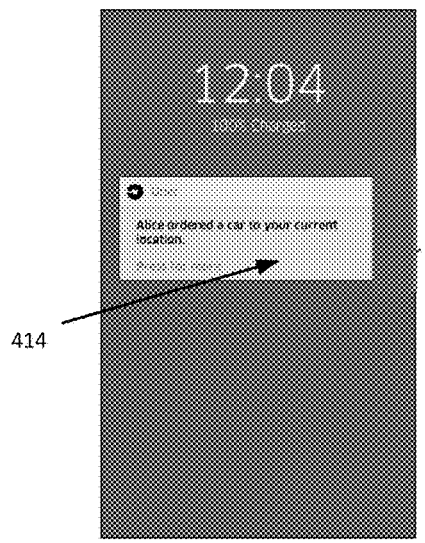

FIG. 4A and FIG. 4B illustrate application interfaces of a service application executing on a mobile device of a contact, according to various examples. In some examples, the service application executes on the mobile devices of the contacts and users as part of a distributed computing system that includes the network computer system 100.

With reference to FIG. 4A, an authorization panel 410 may be rendered on a mobile device of a contact, when the user specifies the contact as, for example, a target of a transport request. In the example provided, the contact may be on the access list of the user. The authorization panel 410 enables the user to grant or deny access to the authorization request generated from, for example, the authorization process 136.

In FIG. 4B, the service application 16 may execute to receive notifications 414 from the network computer system 100. The notifications 414 may coincide with events, such as transitions of the application state on the user's mobile device 10. In an example of FIG. 4B, the notification 414 is to inform the contact that he or she is the addressing target of a service request of the user.

Hardware Diagrams

Figure 5:
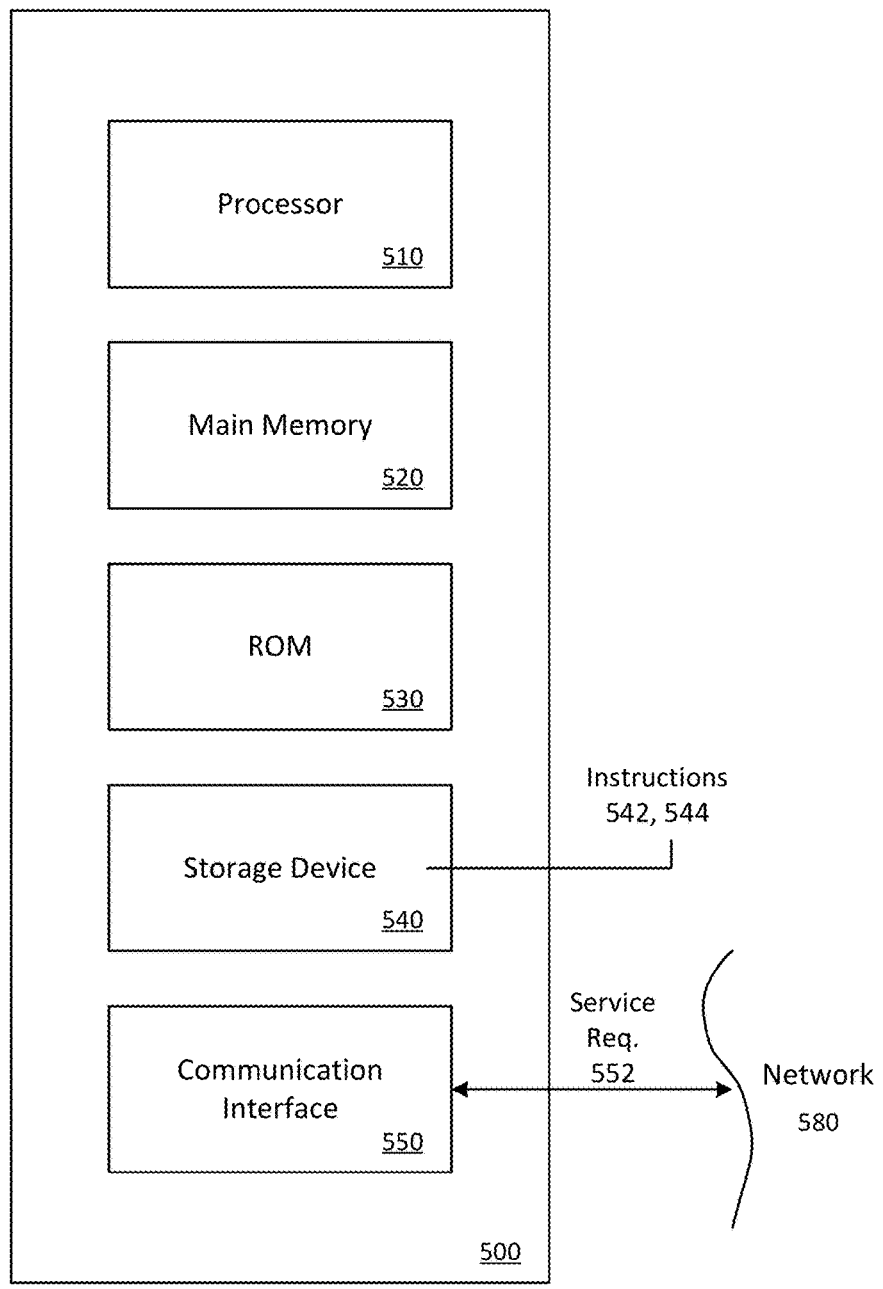
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, the network computer system 100 may be implemented using a computer system such as described by FIG. 5. The network computer system 100 may also be implemented at least in part using a combination of multiple computer systems such as described by FIG. 5.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including instructions 542 for implementing the network computer system 100, and more specifically, instructions 544 for implementing the work flow manager.

For example, the processor 510 can execute the instructions 542 to implement a method such as described with an example of FIG. 2A and FIG. 2B. Likewise, the processor 510 can implement the instructions 542, 544 in order implement a system such as described with an example of FIG. 1.

The communication interface 550 can enable the computer system 500 to communicate with one or more networks 580 (e.g., cellular network) through use of the network link (wireless or wireline). Using the network link, the computer system 500 can communicate with one or more other computing devices and/or one or more other servers or data centers. In some variations, the computer system 500 can receive a service request 552 from a client device of a user via the network link. The transit request 552 can include an identifier of the requester and contact, as well as other information such as the transit type.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
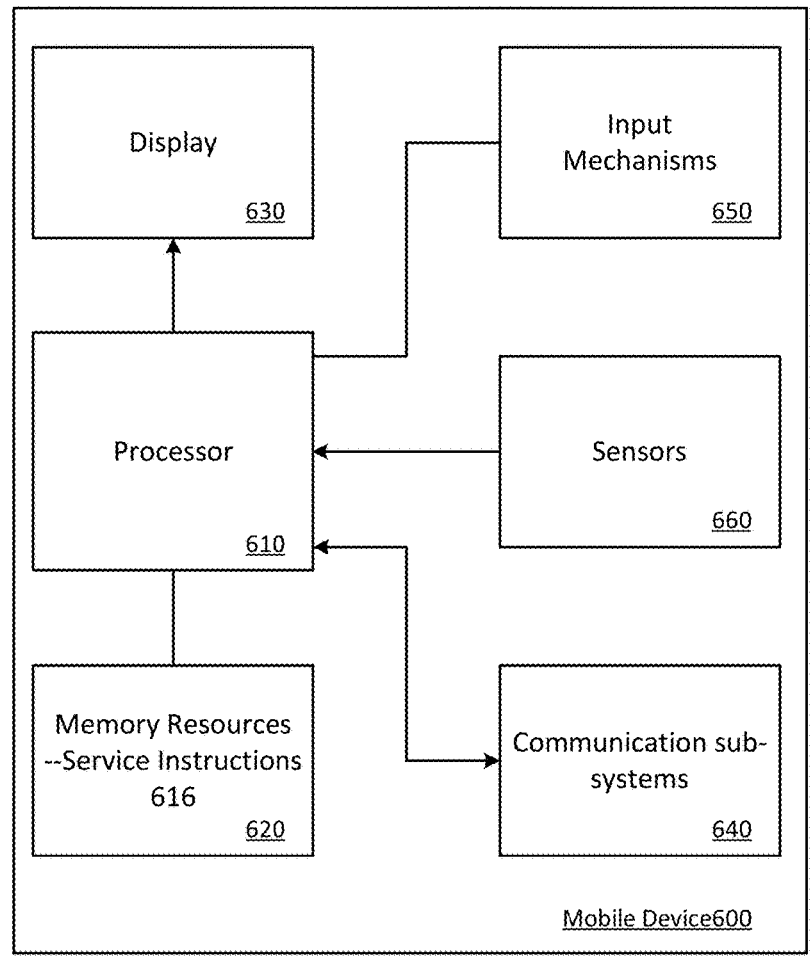
FIG. 6 is a block diagram that illustrates a mobile computing device upon which embodiments described herein may be implemented.

FIG. 6 is a block diagram that illustrates a mobile device upon which embodiments described herein may be implemented. In one embodiment, a mobile device 600 may correspond to a mobile computing device, such as a cellular device that is capable of telephony, messaging, and data services. The mobile device 600 can correspond to a mobile computing device operated by a user or service provider. Examples of such devices include smartphones, tablets (and phablets), and other portable or mobile devices capable of cellular or wireless fidelity ("WiFi") communications. The mobile device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more sensors (e.g., a GPS component, an accelerometer, one or more cameras, etc.) 660. In one example, at least one of the communication sub-systems 640 sends and receives cellular data over data channels and voice channels.

The processor 610 can provide a variety of content to the display 630 by executing instructions and/or applications that are stored in the memory resources 620. For example, the processor 610 is configured with software and/or other logic to perform one or more processes, steps, and other functions, including to execute service instructions 616 for implementing the service application 16, to receive and render an instruction set such as described with any of the examples of FIG. 3A through FIGS. 3J and 4A and FIG. 4B.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system to address service providers to contacts, the network computer system comprising:
    a memory to store instructions;
    one or more processors to execute the instructions to:
        receive a set of data corresponding to a service request from a mobile device of a user;
        determine a contact using the set of data, the contact corresponding to a person who is linked to the user;
        initiate (i) a first process to request authorization from the contact to configure a destination location of the service request to correspond with a current location of the contact, by utilizing an identifier of the contact, and (ii) a second process to obtain a service parameter for the service request, the second process including receiving, from a mobile device of the contact, location information indicating the current location of the contact, the current location of the contact being different than the current location of the user; and
        in response to receiving authorization from the contact to configure the destination location of the service request to correspond to the current location of the contact, transmit data to the mobile device of the user to cause the mobile device of the user to display a service graphical interface that presents dynamic information based on the current location of the contact.

2. The network computer system of claim 1, wherein the service parameter is variable over a duration in which the first process is performed, and wherein the service parameter is obtained upon completion of the first process.

3. The network computer system of claim 1, wherein the service parameter is variable over a duration in which the first process is performed, and wherein the service parameter is obtained before completion of the first process.

4. The network computer system of claim 1, wherein the service parameter is time-dependent and includes an estimated duration for a service provider to arrive at the current location of the contact.

5. The network computer system of claim 1, wherein the service parameter is time-dependent and is based at least in part on a number of service providers within a threshold range of the user of the service request.

6. The network computer system of claim 1, wherein the service graphical interface includes an order panel for the user of the service request.

7. The network computer system of claim 1, wherein the service graphical interface includes at least one of a confirmation panel or trip panel.

8. The network computer system of claim 1, wherein the one or more processors perform the first process without a priori information of a duration for completing the first process.

9. The network computer system of claim 1, wherein the one or more processors perform the first process by transmitting a notification to the mobile device of the contact.

10. The network computer system of claim 1, wherein the one or more processors execute the instructions to further:
    determine whether the contact is associated with an account.

11. The network computer system of claim 10, wherein the one or more processors select the first process, from multiple available processes, based on a determination of whether the contact is associated with the account.

12. The network computer system of claim 1, wherein the one or more processors execute the instructions to further:
    determine an account associated with the contact from the set of data corresponding to the service request; and
    determine whether the contact is associated with an access list of an online account of the user of the service request.

13. The network computer system of claim 1, wherein the one or more processors execute the instructions to further:
    determine an account associated with the contact from the set of data corresponding to the service request; and
    determine whether the account of the contact includes a permission setting indicating whether the contact authorizes the service request to be addressed to the current location of the contact.

14. The network computer system of claim 13, wherein the permission setting indicates at least one of a time of day, an identity of the user of the service request, or a class of the user of the service request.

15. The network computer system of claim 1, wherein the service parameter is time-dependent and is based at least in part on a number of service providers within a threshold range of the user of the service request.

16. The network computer system of claim 1, wherein the service graphical interface includes an order panel for the user of the service request.

17. A non-transitory computer readable medium that storing instructions that, when executed by one or more processors, cause the one or more processors to:
    receive a set of data corresponding to a service request from a mobile device of a user;
    determine a contact from the set of data, the contact corresponding to a person who is linked to the user;
    initiate (i) a first process to request authorization from the contact to configure a destination location of the service request to correspond with a current location of the contact, by utilizing an identifier of the contact, and (ii) a second process to obtain a service parameter for addressing the service request, the second process including receiving, from a mobile device of the contact, location information indicating the current location of the contact, the current location of the contact being different than a current location of the user; and
    in response to receiving authorization from the contact to configure the destination location of the service request to correspond to the current location of the contact, transmit data to the mobile device of the user to cause the mobile device of the user to display a service graphical interface that presents dynamic information based on the location information indicating the current location of the contact.

18. The non-transitory computer readable medium of claim 17, wherein the service parameter is variable over a duration in which the first process is performed, and wherein the service parameter is obtained upon completion of the first process.

19. The non-transitory computer readable medium of claim 17, wherein the service parameter is variable over a duration in which the first process is performed, and wherein the service parameter is obtained before completion of the first process.

20. The non-transitory computer readable medium of claim 17, wherein the service parameter is time-dependent and includes an estimated duration for a service provider to arrive at the current location of the contact.

* * * * *